United States Patent [19]
Taylor

[11] 3,870,903

[45] Mar. 11, 1975

[54] PHASE CONTROLLED POWER SUPPLY

[75] Inventor: Leo Ottis Taylor, Alto Loma, Calif.

[73] Assignee: Xerox Corporation, Stamford, Conn.

[22] Filed: May 18, 1973

[21] Appl. No.: 361,747

[52] U.S. Cl. ......... 307/252 N, 307/252 W, 315/194, 315/199
[51] Int. Cl. ............................................. H03k 17/72
[58] Field of Search.... 307/252 N, 252 W; 315/194, 315/199; 323/225 C

[56] References Cited
UNITED STATES PATENTS
3,358,186  12/1967  Nomura .............................. 315/194
3,522,522  8/1970  Tiemann ........................... 323/36 X Primary Examiner—John Zazworsky

[57] ABSTRACT

A phase controlled power supply having a gate-controlled current regulator, such as a silicon controlled rectifier, and a gate signal generator circuit including a unijunction transistor, in which substantially equal power dissipation is provided through a load device regardless of variations in the magnitude of an alternating current supply voltage. Regulation of the current flow is achieved by varying the firing time or angle of the unijunction transistor when there is a variation in the magnitude of the supply voltage. This variation is achieved by connecting a capacitor having a value between 0.1 and 0.5 microfarads between the base-two electrode of the unijunction transistor and an electrode of the gate-controlled current regulator.

1 Claim, 3 Drawing Figures

PHASE CONTROLLED POWER SUPPLY

BACKGROUND OF THE INVENTION

The term "a-c phase control" is applied in reference to a process of rapid on-off switching which connects an alternating current supply to a load for a controlled fraction of each cycle of the current waveform. A-c phase control is used extensively as a means for controlling the average power to various electrical loads, such as electric lamps, electric heaters, and electric motors. Generally, a-c phase control is achieved by solid-state circuitry comprised of a gate-controlled current regulator including at least one semi-conductor device, such as silicon controlled rectifier, and gate signal generator circuitry for providing a gate signal, usually in the form of an electrical pulse, to the gate electrode of the gate-controlled current regulator. One form of gate signal circuitry used recently with circuitry using a silicon controlled rectifier as the gate-controlled current regulator includes a unijunction transistor coupled to the gate electrode of the silicon controlled rectifier and a RC time constant circuit coupled to the gate or emitter of the unijunction transistor. Conduction of the unijunction transistor is regulated in part by the magnitude of the charge on the capacitor of the RC time constant circuit.

Many systems using a-c phase control circuitry require that the gate signal circuitry control the conduction of the gate-controlled current regulator such that substantially the same amount of current flows through a load device coupled to the current regulator regardless of fluctuations in the magnitude of the a-c supply voltage. For example, in a photoillumination system designed to operate at 120 volts a-c, the gate signal circuitry must be able to control the conduction of the current regulator such that substantially the same magnitude of current flows through the illumination lamp regardless of fluctuations of 20 volts in the a-c supply voltage. Heretofore, gate signal circuitry including a unijunction transistor and a RC time constant circuit have not been able to provide the desired current regulation under conditions of varying a-c supply voltages. With an increase in the magnitude of the supply voltage, the potential difference between the base-two electrode of the unijunction transistor and the capacitor of the RC time constant circuit of the gate signal generator circuitry reaches the firing voltage of the unijunction transistor too quickly, causing the unijunction transistor to fire prematurely, resulting in premature firing of the current regulator. Since a 10 percent variation in the silicon controlled rectifier firing voltage produces about a 50 percent variation in lamp current, premature firing of the silicon controlled rectifier must be avoided if lamp illumination is to remain constant.

SUMMARY OF THE INVENTION

It is therefore an object of the present invention to provide a new and improved phase controlled power supply circuit.

It is a further object of the present invention to provide a phase controlled power supply circuit that is insensitive to variations in the magnitude of the supply voltage.

It is a still further object of the present invention to provide a phase controlled power supply in which the firing angle of the current regulator of the power supply varies in accordance with the magnitude of the supply voltage.

Another object of the present invention is to provide constant power dissipation in a load device regardless of peak sinusoidal voltage magnitude variations of the supply voltage.

In accordance with the invention, the aforementioned objects are attained by providing an additional capacitor of suitable value in the gate signal generator circuit of a phase controlled power supply having a silicon controlled rectifier as the current regulator and a unijunction transistor as part of the gate signal generator circuit. The capacitor, which is in addition to the capacitor of the RC time constant circuit, is connected between the base-two electrode of the unijunction transistor and a point of reference potential. When there is an increase in the supply voltage, this capacitor, which has a value between 0.1 and 0.5 microfarads, acts as a current source during a portion of the voltage cycle to maintain the potential difference between the base-two electrode and the emitter electrode of the unijunction transistor above the firing voltage of the unijunction transistor to thereby prevent early firing of the unijunction transistor and, hence, prevent early firing of the silicon controlled rectifier.

Other objects of the invention will become readily apparent to those skilled in the art in view of the following detailed disclosure and description thereof, especially when read in conjunction with the accompanying drawings.

DESCRIPTION OF THE PREFERRED EMBODIMENT

Figure 1:
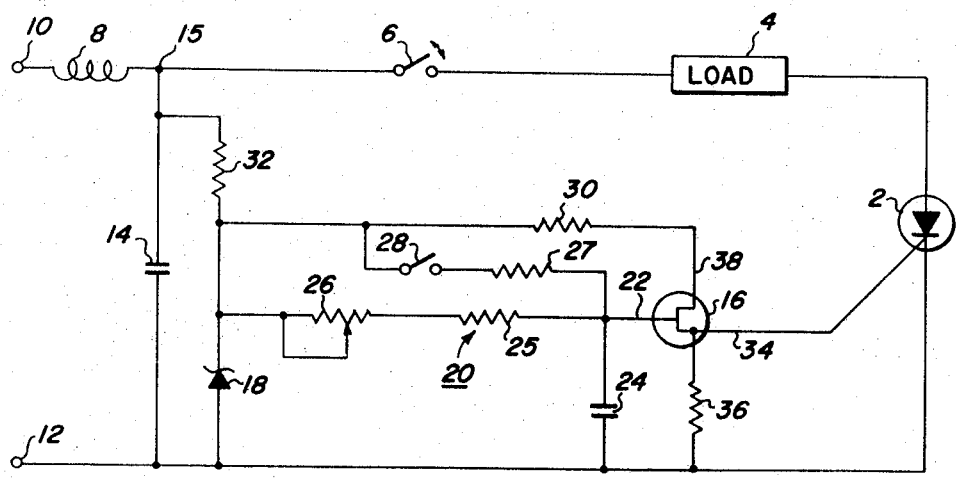
FIG. 1 is a schematic circuit diagram of a prior art phase controlled power supply.

Referring now to FIG. 1 of the accompanying drawings, there is shown a prior art phase controlled power supply circuit wherein a silicon controlled rectifier element (SCR) 2 or any other suitable signal controlled solid-state rectifier is used to control the current flow through a load device 4, such as an electric lamp. The anode-cathode circuit of the SCR 2 is connected in series with the load device 4. A switch 6 and an inductor 8 couple the series circuit across input terminals 10 and 12 which are energized from a suitable alternating current power supply which may be a conventional 120-volt, 60-cycle, single-phase alternating current power supply. A capacitor 14 is connected between terminal 12 and the junction 15 of inductor 8 and switch 6.

A gate signal generator circuit including a unijunction transistor 16, a zener diode 18, and a RC charging circuit 20 is coupled to the gate electrode of SCR 2. The emitter electrode 22 of unijunction transistor 16 is connected to a junction point in RC charging circuit 20, the latter comprising a capacitor 24, resistors 25, 26, and 27, and a switch 28. The capacitor 24 is charged at a rate determined by the value of resistors 25 and 26, the position of switch 28, and the rating of zener diode 18 which is connected across the RC charging circuit 20. The cathode of zener 18 is coupled to the base-two electrode of unijunction transistor 16 via a resistor 30 and to junction joint 15 via a dropping resistor 32. The base-one electrode 24 of unijunction transistor 16 is connected to the gate electrode of SCR 2 and to terminal 12 via resistor 36.

When the capacitor 24 has charged to the emitter breakdown voltage of unijunction transistor 16, transistor 16 becomes conductive, and capacitor 24 discharges through resistor 36. Thus, a pulse which is positive with respect of the cathode potential of SCR 2 is applied to the gate of SCR 2, triggering SCR 2 into a conductive state. The firing or phase angle of the pulse is determined in part by the time constant of the RC charging circuit which includes the variable resistor 26, so that by varying the magnitude of resistor 26, the firing angle of SCR 2 and hence the magnitude of the current through load device 4 and thereby the power dissipated by the load device 4 is varied.

Figure 3:
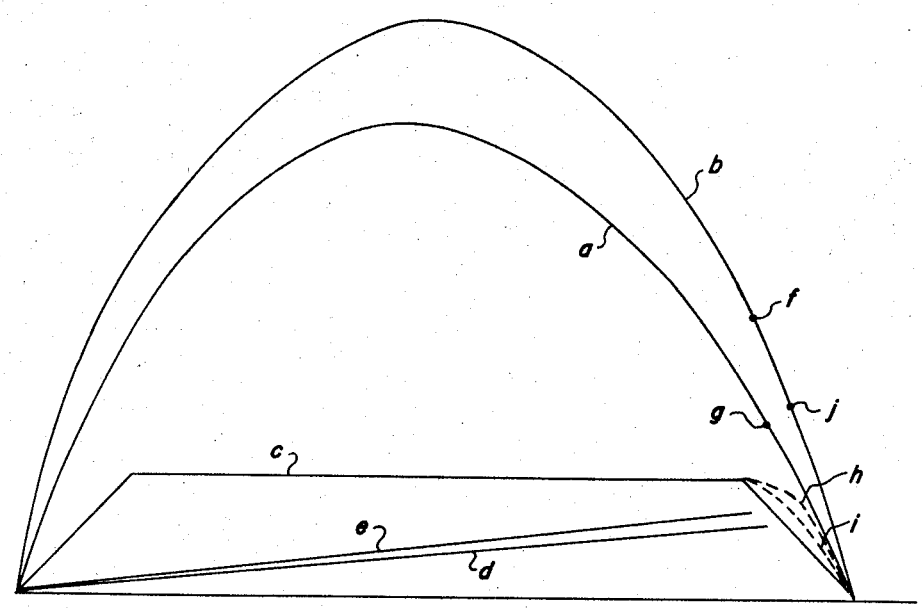
FIG. 3 shows voltage waveforms helpful in the explanation of the operation of the circuits of FIGS. 1 and 2.

In many applications it is necessary that the power dissipated by the load device remain constant once the value of the variable resistor 26 is set. However, the circuit shown in FIG. 1 cannot maintain constant load current with spurious variations in the magnitude of the supply voltage. This shortcoming of the circuit of FIG. 1 is best understood by reference to FIG. 3 in which Curve a represents a portion of a voltage waveform of 120 volts, the desired line voltage, and Curve b represents a portion of the voltage waveform for 140 volts. Curve c represents the voltage at the base-two electrode 38 of unijunction transistor 16, the upper limit of this voltage being the zener diode breakdown voltage. Lines d and e represent the charging rate of capacitor 24 for supply voltages of 120 volts and 140 volts, respectively.

In a unijunction transistor, firing occurs when the voltage differential between the base-two electrode and the emitter electrode falls below a threshold voltage determined by the characteristics of the unijunction transistor. The unijunction transistor will not fire if the voltage difference is above the threshold value. In the circuit of FIG. 1, the threshold voltage for firing the unijunction transistor 16 is achieved earlier in the cycle for a larger supply voltage (for example, point f of waveform b) than for a smaller supply voltage (for example, point g of waveform a). This occurs because the rapid charging of capacitor 24 when the input across terminals 10 and 12 is waveform b results in the threshold voltage between the base-two electrode and the emitter electrode of unijunction transistor 16 being reached more rapidly than it is reached when capacitor 34 is charged by waveform a. Since the area under curves a and b from the point of firing of unijunction transistor 16 to the end of the half cycle represents the current flow through load device 4, it is apparent that a greater current will flow through load device 4 when a voltage represented by curve b is applied across terminals 10 and 12 than when a voltage represented by curve a is applied across terminals 10 and 12. It is estimated that a 10 percent increase in supply voltage produces a 50 percent increase in current through load device 4.

It is therefore an object of this invention to eliminate the aforedescribed drawback of the phase controlled power supply circuits of the prior art as illustrated in FIG. 1. According to the invention, this object is achieved by maintaining the voltage of the base-two electrode of the unijunction transistor at, or near, the zener diode breakdown voltage for a longer period of time than does the conventional circuit of FIG. 1. This allows the circuit to achieve the threshold firing voltage of the unijunction transistor sooner for small input voltages than for larger input voltages. Structurally, this is achieved by connecting, in FIG. 1, a capacitor, having a value between 0.1 and 0.5 microfarads, between the base-two electrode 38 of the unijunction transistor 16 and the terminal 12.

Figure 2:
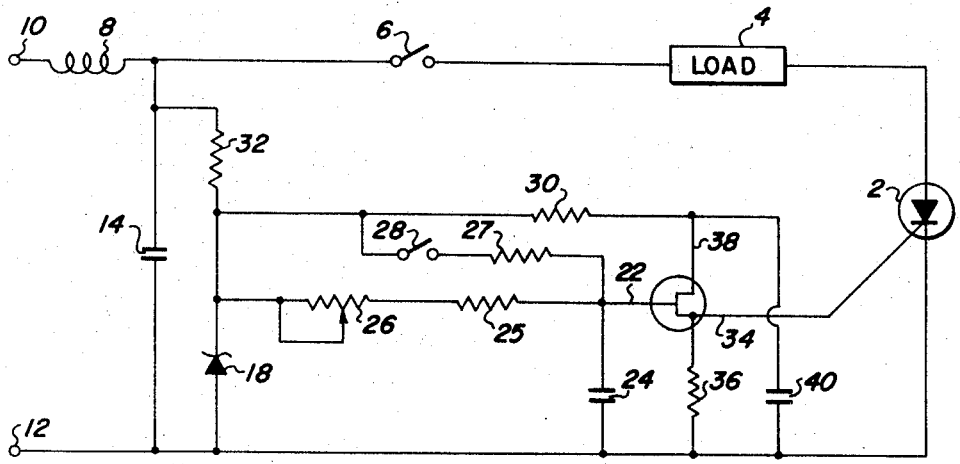
FIG. 2 is a schematic circuit diagram of a phase controlled power supply in accordance with the present invention.

The improved circuit is illustrated in FIG. 2 wherein the same reference numerals have been applied to parts corresponding to those of FIG. 1. The circuit of FIG. 2 is the same as that of FIG. 1 except that a capacitor 40 having a value between 0.1 and 0.5 microfarads is connected between the base-two electrode 38 of unijunction transistor 16 and terminal 12.

The circuit of FIG. 2 is unlike that described in U.S. Pat. No. 3,358,186 in which a filter capacitor is connected to a unijunction transistor of a gate signal generator circuit to eliminate the effects of sudden voltage drops in the supply due to the conduction of one or more silicon controlled rectifiers. The capacitor of that patent must be about 0.1 picofarads to achieve the desired filtering effect whereas the capacitor of this invention must be between 0.1 and 0.5 microfarads. Also, the capacitor of the referenced patent controls sudden voltage drops but says nothing about controlling increases in supply voltage.

As a result of the modification of the gate signal generating circuit by the addition of capacitor 40, the circuit of this invention produces substantially constant load current or power dissipation even with fluctuations in the supply voltage. As the voltage at the base-two electrode 38 of unijunction transistor 16 starts to decrease in the latter portion of the voltage cycle, due to the action of resistor 30, the capacitor 40, which has been charged to the zener voltage, acts like a current source to maintain the voltage at the base-two electrode 38 of unijunction transistor 16 at a high level as indicated by the dotted portion of FIG. 3; the voltage dropping off faster for a smaller supply voltage (dotted curve i) than for a larger supply voltage (dotted curve h). Thus, the threshold (minimal) voltage for firing the unijunction transistor 16 is achieved earlier for a small voltage supply, for example, point g, than for a larger voltage supply, for example, point j. Accordingly, the current flow through load 4 is substantially the same regardless of the magnitude of the supply voltage.

As an example of suitable values for the components of the circuit of FIG. 2, the zener diode 18 may be a 30-volt zener, dropping resistor 32 may be 20K ohms, resistor 30 may be 470 ohms, resistor 36 may be 126 ohms, coil 8 may be 50 microhenries, and capacitor 14 may be 0.1 microfarads. In the RC charging circuit, the resistor 25 may be 39K ohms, the resistor 26 may be 20K ohms, and the capacitor 24 may be 0.1 microfarads. The silicon controlled rectifier 2 may be a GE C106, and the unijunction transistor 22 may be a GE 2N2646. As previously stated, capacitor 40 will have a value between 0.1 and 0.5 microfarads.

While the present invention has been described with reference to a preferred arrangement, it will be understood to those skilled in the art that various changes may be made to the phase controlled power supply without departing from the true spirit and scope of the invention. Specifically, full wave operation of the load device 4 can be achieved by connecting a full wave rectifier between the voltage supply source and the series-connected load-SCR circuit. The full wave rectifier circuit shown in U.S. Pat. No. 3,358,186 would be satisfactory.

What is claimed is:

1. A phase controlled power supply circuit comprising a source for supplying an alternating current signal having a desired magnitude to a pair of input terminals, a load device and a silicon controlled rectifier connected in series with said pair of terminals, a gate-signal generating circuit for said silicon controlled rectifier coupled to said terminals and to the gate electrode of said silicon controlled rectifier, said gate-signal generating circuit comprising a unijunction transistor, a resistor, a zener diode coupled across the base electrodes of said unijunction transistor and a firing circuit for said unijunction transistor coupled to the emitter electrode of said unijunction transistor; the base-one electrode of said unijunction transistor is connected directly to said gate electrode of said silicon controlled rectifier and is connected through said resistor to a terminal of said silicon controlled rectifier, a capacitor having a value between 0.1 and 0.5 microfarads connected directly between the base-two electrode of said unijunction transistor and said terminal of said silicon controlled rectifier for varying the firing angle of said silicon controlled rectifier when the magnitude of said alternating current signal varies from said desired magnitude such that substantially the same power is dissipated by said load device even though there are variations in the magnitude of said alternating current signal.

* * * * *